United States Patent
Yuan et al.

(10) Patent No.: US 12,279,249 B2
(45) Date of Patent: Apr. 15, 2025

(54) METHODS, DEVICES AND COMPUTER STORAGE MEDIA FOR MULTI-TRP COMMUNICATION

(71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 17/627,274

(22) PCT Filed: Jul. 18, 2019

(86) PCT No.: PCT/CN2019/096566
§ 371 (c)(1),
(2) Date: Jan. 14, 2022

(87) PCT Pub. No.: WO2021/007854
PCT Pub. Date: Jan. 21, 2021

(65) Prior Publication Data
US 2022/0264600 A1     Aug. 18, 2022

(51) Int. Cl.
*H04W 4/00*     (2018.01)
*H04W 24/08*     (2009.01)
(Continued)

(52) U.S. Cl.
CPC ....... *H04W 72/1263* (2013.01); *H04W 24/08* (2013.01); *H04W 72/02* (2013.01); *H04W 72/046* (2013.01); *H04W 72/20* (2023.01)

(58) Field of Classification Search
CPC . H04W 72/1263; H04W 24/08; H04W 72/02; H04W 72/046; H04W 72/20; H04B 7/0408; H04B 7/0695
See application file for complete search history.

(56) References Cited

U.S. PATENT DOCUMENTS 10,973,044 B1 *   4/2021   Venugopal ............ H04W 80/02
2018/0324850 A1   11/2018   Amuru et al.
(Continued)

FOREIGN PATENT DOCUMENTS

CN     107734684 A     2/2018
CN     108632971 A     10/2018
(Continued)

OTHER PUBLICATIONS

3GPP TS 38.213 V15.1.0; 3rd Generation Partnership Project; Technical Specification Group Radio Access Network; NR; Physical layer procedures for control. (Year: 2018).*
(Continued)

*Primary Examiner* — Thai Dinh Hoang
(74) *Attorney, Agent, or Firm* — Sughrue Mion, PLLC

(57) ABSTRACT

Embodiments of the present disclosure relate to methods, devices and computer readable media for multi-TRP communication. A method comprises determining a first beam for a first physical shared channel which is scheduled by control information; determining a second beam for a second physical shared channel which is scheduled by the control information, the second beam being different from the first beam; and performing communication over the first physical shared channel via the first beam and over the second physical shared channel via the second beam.

4 Claims, 10 Drawing Sheets

(51) Int. Cl.
  *H04W 72/02* (2009.01)
  *H04W 72/044* (2023.01)
  *H04W 72/1263* (2023.01)
  *H04W 72/20* (2023.01)

(56) References Cited

U.S. PATENT DOCUMENTS

| | | | |
|---|---|---|---|
| 2019/0230730 A1* | 7/2019 | Wang | H04W 74/0833 |
| 2019/0349964 A1* | 11/2019 | Liou | H04W 76/27 |
| 2021/0160964 A1* | 5/2021 | Sun | H04W 80/02 |
| 2021/0345410 A1* | 11/2021 | Zhou | H04W 52/50 |
| 2022/0053522 A1* | 2/2022 | MolavianJazi | H04W 72/1263 |
| 2022/0086769 A1* | 3/2022 | Guo | H04W 52/146 |
| 2022/0086772 A1* | 3/2022 | Cozzo | H04W 52/281 |
| 2022/0210748 A1* | 6/2022 | Huang | H04W 52/365 |
| 2022/0217653 A1* | 7/2022 | Kung | H04L 5/0048 |
| 2022/0225247 A1* | 7/2022 | Huang | H04W 52/34 |
| 2022/0271890 A1* | 8/2022 | Grossmann | H04L 5/0051 |
| 2022/0394742 A1* | 12/2022 | Jang | H04W 72/23 |
| 2022/0408468 A1* | 12/2022 | Jang | H04W 72/23 |
| 2023/0224125 A1* | 7/2023 | Yuan | H04B 7/06968 370/329 |
| 2023/0261719 A1* | 8/2023 | Liu | H04B 7/0695 375/267 |
| 2023/0292250 A1* | 9/2023 | Määttänen | H04W 52/242 |

FOREIGN PATENT DOCUMENTS

| | | | | |
|---|---|---|---|---|
| JP | 2022-547778 A | | 11/2022 | |
| WO | 2018/027831 A1 | | 2/2018 | |
| WO | 2018/028586 A1 | | 2/2018 | |
| WO | 2019/065459 A1 | | 4/2019 | |
| WO | 2020/209282 A1 | | 10/2020 | |
| WO | WO-2021210108 A1 * | 10/2021 | | H04B 7/024 |
| WO | WO-2021260658 A1 * | 12/2021 | | H04W 52/08 |
| WO | WO-2022148638 A1 * | 7/2022 | | H04W 52/146 |
| WO | WO-2022157721 A1 * | 7/2022 | | H04W 52/04 |
| WO | WO-2022197065 A1 * | 9/2022 | | H04B 7/0404 |
| WO | WO-2023209695 A1 * | 11/2023 | | H04L 27/261 |

OTHER PUBLICATIONS

Huawei, Hisilicon, "Enhancements on Multi-TRP/panel transmission", 3GPP TSG RAN WG1 #97, R1-1906029, May 13-17, 2019, pp. 1-18, Reno, USA.
Vivo, "Further discussion on Multi-TRP/Panel transmission", 3GPP TSG RAN WG1 #97, R1-1906159, May 13-17, 2019, pp. 1-18, Reno, USA.
International Search Report of PCT/CN2019/096566 dated Apr. 22, 2020 [PCT/ISA/210].
Written Opinion of PCT/CN2019/096566 dated Apr. 22, 2020 [PCT/ISA/237].
Japanese Office Action dated Apr. 25, 2023 in Japanese Application No. 2022-503016.
ZTE, "Additional details of latency and overhead reduction for beam management", 3GPP TSG RAN WG1 Ad-Hoc Meeting 1901, R1-1900093, Jan. 21-25, 2019, Taipei (5 pages total).
ZTE, "Enhancements on Multi-TRP and Multi-panel Transmission", 3GPP TSG RAN WG1 #97, R1-1906236, May 13-17, 2019, Reno, USA (15 pages total).
ZTE, "Considerations on beam management for multi-TRP", 3GPP TSG RAN WG1 #97, R1-1906244, May 13-17, 2019, Reno, USA (8 pages total).
Lenovo et al., "Discussion of multi-TRP/ panel transmission", 3GPP TSG RAN WG1 Meeting #97, R1-1906274, May 13-17, 2019, Reno, USA (23 pages total).
Ericsson, "Physical layer aspects of RACH-less Ho", 3GPP TSG-RAN WG1 Meeting #96bis, Tdoc R1-1905220, Apr. 8-12, 2019 (4 pages total).
VIVO, "Maintenance for beam management", 3GPP TSG RAN WG1 #94b, R1-1810366, Oct. 8-12, 2018 (6 pages total).
"3GPP TS 38.213", 3rd Generation Partnership Project, V15.1.0, Release 15, Mar. 2018 (77 pages total).
Ericsson, "Correction to align RAN1 and RAN4 specifications for EN-DC power control", 3GPP TSG RAN WG1 Meeting #96, R1-1903710, Feb. 25-Mar. 1, 2019 (23 pages total).
Communication issued Jan. 16, 2025 in Chinese Application No. 201980098543.2.
Communication issued Mar. 4, 2025 in Japanese Application No. 2023-220829.

* cited by examiner

METHODS, DEVICES AND COMPUTER STORAGE MEDIA FOR MULTI-TRP COMMUNICATION

CROSS REFERENCE TO RELATED APPLICATIONS

This application is a National Stage of International Application No. PCT/CN2019/096566, filed Jul. 18, 2019.

TECHNICAL FIELD

Embodiments of the present disclosure generally relate to the field of telecommunication, and in particular, to methods, devices and computer storage media for multi-Transmission and Reception Point (TRP) communication.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP).

In NR, a network device (for example, a next generation NodeB (gNB)) may be equipped with multiple TRPs or antenna panels. That is, the network device can communicate with a terminal device (for example, user equipment (UE)) via one or more of the multiple TRPs or antenna panels, which is also referred to as "multi-TRP communication". In some multi-TRP communication schemes, single downlink control information (DCI) may be used to schedule more than one Physical Downlink Shared Channel (PDSCH) or different DCI may be used to schedule more than one Physical Uplink Control Channel (PUCCH).

SUMMARY

In general, example embodiments of the present disclosure provide methods, devices and computer storage media for multi-TRP communication.

In a first aspect, there is provided a method for communication. The method comprises determining a first beam for a first physical shared channel which is scheduled by control information. The method also comprises determining a second beam for a second physical shared channel which is scheduled by the control information, the second beam being different from the first beam. The method further comprises performing communication over the first physical shared channel via the first beam and over the second physical shared channel via the second beam.

In a second aspect, there is provided a method for communication. The method comprises determining a first reference power for performing communication over a first uplink control channel and a second reference power for performing communication over a second uplink control channel, the first uplink control channel and the second uplink control channel being scheduled by different control information. The method also comprises determining, based on the first reference power and the second reference power, a first target power for performing the communication over the first uplink control channel and a second target power for performing the communication over the second uplink control channel. The method further comprises performing the communication over the first uplink control channel with the first target power and the communication over the second uplink control channel with the second target power.

In a third aspect, there is provided a device for communication. The device comprises a processor and a memory. The memory is coupled to the processor and stores instructions thereon. The instructions, when executed by the processor, cause the device to perform actions comprising determining a first beam for a first physical shared channel which is scheduled by control information. The acts also comprise determining a second beam for a second physical shared channel which is scheduled by the control information, the second beam being different from the first beam. The acts further comprise performing communication over the first physical shared channel via the first beam and over the second physical shared channel via the second beam.

In a fourth aspect, there is provided a device for communication. The device comprises a processor and a memory. The memory is coupled to the processor and stores instructions thereon. The instructions, when executed by the processor, cause the device to perform actions comprising determining a first reference power for performing communication over a first uplink control channel and a second reference power for performing communication over a second uplink control channel, the first uplink control channel and the second uplink control channel being scheduled by different control information. The acts also comprise determining, based on the first reference power and the second reference power, a first target power for performing the communication over the first uplink control channel and a second target power for performing the communication over the second uplink control channel. The acts further comprise performing the communication over the first uplink control channel with the first target power and the communication over the second uplink control channel with the second target power.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
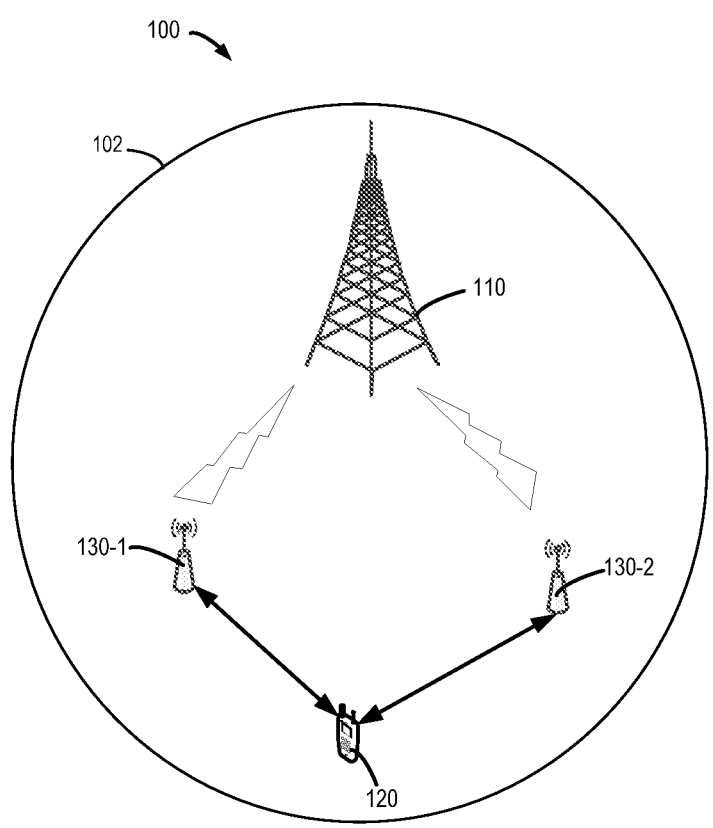
FIG. 1 illustrates an example communication network in which some embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

FIG. 1 shows an example communication network 100 in which embodiments of some aspects of the present disclosure can be implemented. The network 100 includes a network device 110, which is coupled with two TRPs/panels 130-1 and 130-2 (collectively referred to as TRPs 130 or individually referred to as TRP 130). The network 100 also includes a terminal device 120 served by the network device 110. The serving area of the network device 110 is called as a cell 102. It is to be understood that the number of network devices, terminal devices and TRPs is only for the purpose of illustration without suggesting any limitations. The network 100 may include any suitable number of network devices, terminal devices and TRPs adapted for implementing embodiments of this aspect of the present disclosure. Although not shown, it is to be understood that one or more terminal devices may be located in the cell 102 and served by the network device 110.

As used herein, the term "TRP" may refer to an antenna array (with one or more antenna elements) available to the network device located at a specific geographical location. For example, a network device may be coupled with multiple TRPs in different geographical locations to achieve better coverage. Alternatively or in addition, multi TRPs may be incorporated into a network device, or in other words, the network device may comprise the multi TRPs. It is to be understood that the TRP may also be referred to as a "panel", which also refers to an antenna array (with one or more antenna elements) or a group of antennas. It is to be also be understood that the TRP may refer to a logical concept which may be physically implemented by various manner.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As shown in FIG. 1, the network device 110 may communicate with the terminal device 120 via the TRPs 130-1 and 130-2. In the following, the TRP 130-1 may be also referred to as the first TRP, while the TRP 130-2 may be also referred to as the second TRP. Each of the TRPs 130 may provide a plurality of beams for communication with the terminal device 120. The first and second TRPs 130-1 and 130-2 may be included in a same serving cell (such as, the cell 102 as shown in FIG. 1) or different serving cells provided by the network device 110.

Although some example embodiments of the present disclosure are described with reference to the first and second TRPs 130-1 and 130-2 within a same serving cell 102 provided by the network device 110, these embodiments are only for the purpose of illustration and help those skilled in the art to understand and implement the present disclosure, without suggesting any limitations on the scope of the present disclosure. The embodiments of the present disclosure may be implemented in a network where the TRPs 130 are within different serving cells provided by the network device 110. It is to be understood that the present disclosure described herein can be implemented in various manners other than the ones described below.

As described above, in some multi-TRP communication schemes, single DCI may be used to schedule more than one PDSCH or different DCI may be used to schedule more than one PUCCH. For example, the network device may schedule two PDSCHs by single DCI with for example each of the PDSCHs corresponding to one of two TRPs. It takes time for the terminal device to decode the DCI to determine information about the two PDSCHs. Before the DCI is decoded, the terminal device may not have the knowledge of the beams indicated by the network device for the two PDSCHs. As such, there may be latency in performing PDSCH transmission. To reduce the latency, a default beam can be used by the terminal device to perform the PDSCH transmission before the DCI is decoded. However, if there are two PDSCHs which require different beams, for example, in the case of two TRPs, how to select beams for the two PDSCHs need to be addressed.

As used herein, the term "beam" refers to a resource(s) in the spatial domain and is indicated by a set of parameters. In 3GPP specifications for NR, the beam may be indicated by the quasi-colocation (QCL) type D information, which is included in a Transmission Configuration Indication (TCI) state. The beam for PDSCH as used herein is used for reception.

Example embodiments of the present disclosure provide a solution for multi-TRP communication. This solution enables beam selection for different PDSCHs or different parts of a PDSCH. In this way, latency of downlink transmission can be reduced, so as to achieve high performance.

Figure 2:
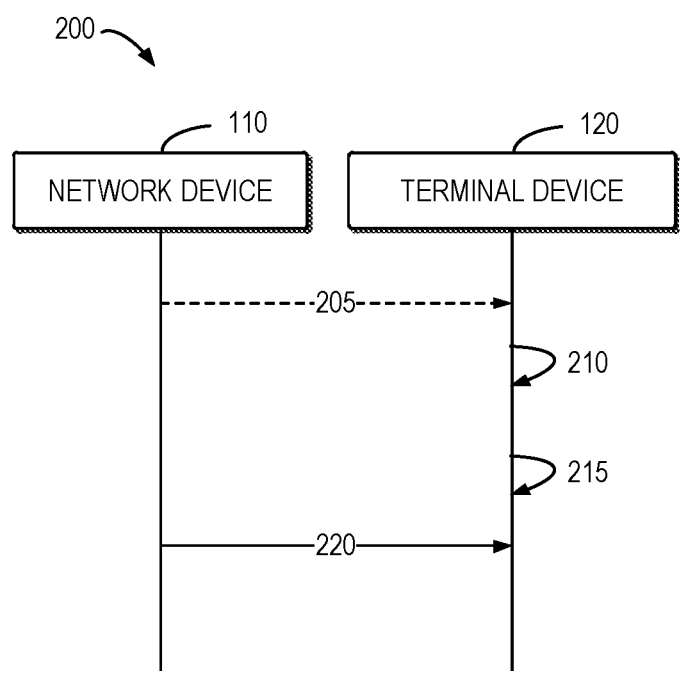
FIG. 2 is a schematic diagram illustrating an example process in accordance with some embodiments of the present disclosure.

FIG. 2 is a schematic diagram illustrating an example process 200 in accordance with some embodiments of the present disclosure. As shown in FIG. 2, the example process 200 may involve the network device 110 and the terminal device 120. It is to be understood that the process 200 may include additional acts not shown and/or may omit some acts as shown, and the scope of the present disclosure is not limited in this regard.

As shown in FIG. 2, the network device 110 may transmit 205 control information (e.g., DCI) to the terminal device 120. The control information may schedule more than one physical shared channel, each of which corresponds to different TRPs. For example, the DCI may schedule a first PDSCH corresponding to the first TRP 130-1 and a second PDSCH corresponding to the first TRP 130-2.

The terminal device 120 determines 210 a first beam for a first physical shared channel which is scheduled by the control information received from the network device 110. In some example embodiments, the first beam may be a default beam to be used prior to the control information being decoded and/or switching to a new beam indicated by the control information. For example, before the DCI is decoded by the terminal device 120, there may be absent of any beam indicated by any DCI for performing PDSCH reception, and before switching to the new beam indicated by the DCI, there may be some time needed to enable the new beam. As such, the terminal device 120 may use a default beam to perform PDSCH reception.

The terminal device 120 determines a second beam for a second physical shared channel which is scheduled by the control information received from the network device 110. The second beam is different from the first beam. In some example embodiments, the second beam may be a further default beam to be used prior to the control information being decoded and/or switching to a new beam indicated by the control information. In some example embodiments, the second beam may be a beam as indicated by the DCI. Since single DCI may schedule two PDSCHs corresponding to different TRPs, there is a need for the terminal device 120 to use two different beams to perform PDSCH receptions via different TRPs.

Figure 3:
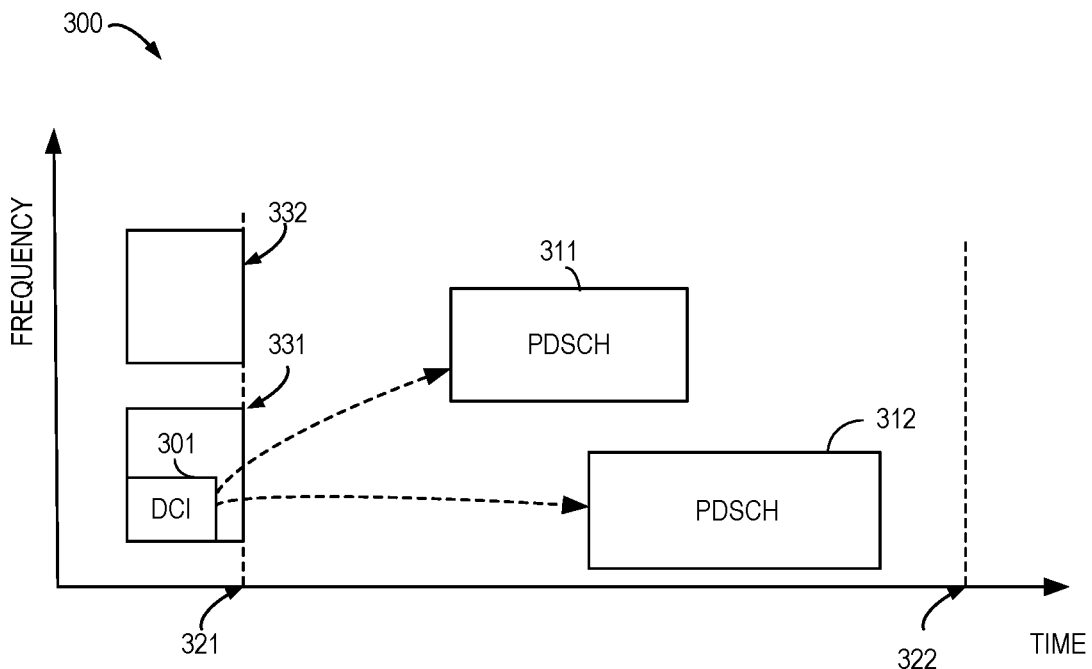
FIG. 3 shows a schematic diagram illustrating multi-PDSCH according to some embodiments of the present disclosure.

In some example embodiments, both the first beam and the second beam may be default beams. Now reference is made to FIG. 3, which shows a schematic diagram 300 illustrating multi-PDSCH according to some embodiments of the present disclosure. As shown in FIG. 3, the DCI 301 may schedule a first PDSCH 311 corresponding to the first TRP 130-1 and a second PDSCH 312 corresponding to the second TRP 130-2. The time instant 321 represents an instant when the monitoring of PDCCH is ended and the time instant 322 represents an instant when the decoding of the DCI 301 is completed and/or a new beam indicated by the DCI 301 is ready for PDSCH reception.

Since the DCI 301 has not been decoded, during the time interval between the time instants 321 and 322, the terminal device 120 may use two different default beams for performing communication over PDSCH, for example over the first PDSCH 311 and the second PDSCH 312. It is to be noted that although the PDSCHs scheduled by single DCI are referred to as a first PDSCH and a second PDSCH, they also may be referred to as a first part of a PDSCH and a second part of the PDSCH.

In some example embodiments, the first beam may be determined based on control resource sets (CORESETs) configured for monitoring the control information. A set of CORESETs or a CORESET group may be configured to monitor PDCCH. The beam associated with a CORESET from the set of CORESET may be determined as the first beam. As shown in FIG. 3, the CORESET 331 and CORE-SET 332 may be configured to the terminal device 120 for monitoring PDCCH and the DCI 301 may be monitored within the COREST 331. A beam associated with the CORESET 331 may be determined as the first beam. In such a case, the DCI 301 may be transmitted via the first TRP 130-1 or otherwise correspond to the first TRP 130-1.

The second beam may be determined based on available TCI states, which contain the QCL-type D information. A number of TCI states for PDSCH transmission, which may be activated by a Medium Access Control (MAC) Control Element (CE) received from the network device, may be referred to as available TCI states herein. The second beam may be determined based on the available TCI states corresponding to the second TRP 130-2. A beam corresponding to a particular TCI state from the available TCI states may be determined as the second beam. For example, the beam corresponding to the activated TCI state (e.g., with the lowest ID) which is applicable for PDSCH reception for the second TRP 130-2 may be determined as the second beam.

In some example embodiments, both the first beam and the second beam may be determined based on CORESETs configured for monitoring the control information. In such cases, a CORESET may be configured with at least two TCI states or a TCI state with at least two pieces of QCL-type D information, and thus the CORESET may be associated with at least two beams. The first beam and the second beam may be selected from the at least two beams. For example, the first beam and the second beam may be selected from the at least two beams associated with the CORESET within which the control information is monitored, that is the CORESET 331 for the example shown in FIG. 3.

As another example, the first beam and the second beam may be determined based on the CORESET with the lowest CORESET ID. As shown in FIG. 3, the DCI 301 may correspond to the first TRP 130-1 and a set of CORESETs or a CORESET group (e.g. CORESETs 331 and 332) may be configured to correspond to the first TRP 130-1. The first beam and the second beam may be determined based on the CORESET with the lowest CORESET ID from the set of CORESETs or the CORESET group (e.g. CORESETs 331 and 332).

In some example embodiments, the first beam and the second beam may be determined based on available TCI states. A first set of TCI states may be activated by MAC CE for the PDSCH corresponding to the first TRP 130-1, e.g. the first PDSCH 311, while a second set of TCI states may be activated by the MAC CE for the PDSCH corresponding to the second TRP 130-2, e.g. the second PDSCH 312. A beam corresponding to a particular TCI state selected from the first set of TCI states may be determined as the first beam and a beam corresponding to a particular TCI state selected from the second set of TCI states may be determined as the second beam. For example, the particular TCI state may be the TCI state with the lowest ID in the respective set of TCI states.

The above example embodiments are described to illustrate the determination of the first and second beams. It is to be understood that aspects of these example embodiments can be combined. For example, the approach as described to determine the first beam may be used to determine the second beam in some other example embodiments and vice versa.

Now reference is made back to FIG. 2. After determining the first beam and the second beam, the terminal device 120 performs 220 communications over the first physical shared channel via the first beam and over the second physical shared channel via the second beam. For example, the terminal device 120 may receive data over the first PDSCH 311 via the first beam and over the second PDSCH 312 via the second beam.

Figure 4:
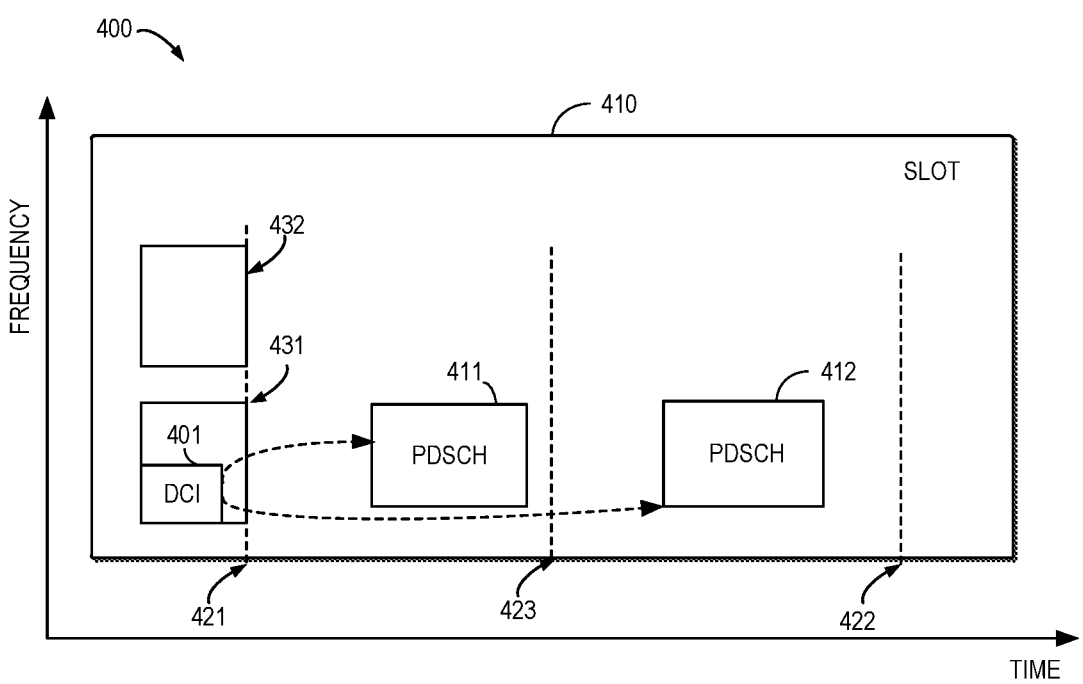
FIG. 4 shows a schematic diagram illustrating multi-PDSCH according to some embodiments of the present disclosure.

In some example embodiments, in performing the communication, a switch between the first beam and the second beam is performed based on a criterion defined in the time domain. Reference is now made to FIG. 4, which shows a schematic diagram 400 illustrating multi-PDSCH according to some embodiments of the present disclosure. As shown in FIG. 4, the DCI 401 may schedule a first PDSCH 411 corresponding to the first TRP 130-1 and a second PDSCH 412 corresponding to the second TRP 130-2. The time instant 421 represents an instant when the monitoring of PDCCH is ended and the time instant 422 represents an instant when the decoding of the DCI 401 is completed and/or a new beam indicated by the DCI 401 is ready for PDSCH reception.

As shown in FIG. 4, the DCI 401, the first PDSCH 411 and the second PDSCH 412 are all within the same slot 410. Since the DCI 401 has not been decoded or the new beam is not ready, during the time interval between the time instants 421 and 422, the terminal device 120 may use default beams for performing communication over PDSCH. For example, the first beam may be used to before the time instant 423, and the second beam may be used after the time instant 423. As such, a switch of receiving beams occurs at the time instant 423. The first beam and the second beam may be determined as described with respect to any of the above example embodiments.

The time instant 423 may be considered as a TDM switching threshold for TCI. That is, a first TCI state is used before the time instant 423 and a second TCI state different from the first TCI state is used after the time instant 423. The TDM switching threshold may be configured by the network device 110 or may be predefined. For example, the time instant 423 may be determined such that a time duration before the time instant 423 within the slot 410 is the same as a time duration after the time instant 423 within the slot 410.

In some example embodiments, one or more CORESET with monitoring search space (SS) may be related to Ultra Reliability Low Latency Communication (URLLC), and such a CORESET may be referred to as URLLC CORESET for ease of discussion. Meanwhile, a CORESET which is not related to URLLC may be referred to as non-URLLC CORESET. In such example embodiments, the URLLC CORESET may be prioritized over the non-URLLC CORESET. The above examples with respect to the default beams for PDSCHs may be implemented in association with the URLLC CORESET. For example, the CORESET 431 for monitoring the DCI 401 is a URLLC CORESET and the COREST 432 is a non-URLLC CORESET When there is a URLLC CORESET with SS for monitoring DCI in the slot, the above examples with two beams for multiple TRPs can be applied. When these is only non-URLLC CORESET with SS for monitoring DCI in the slot, the single TRP based transmission schemes can be applied.

Figure 5:
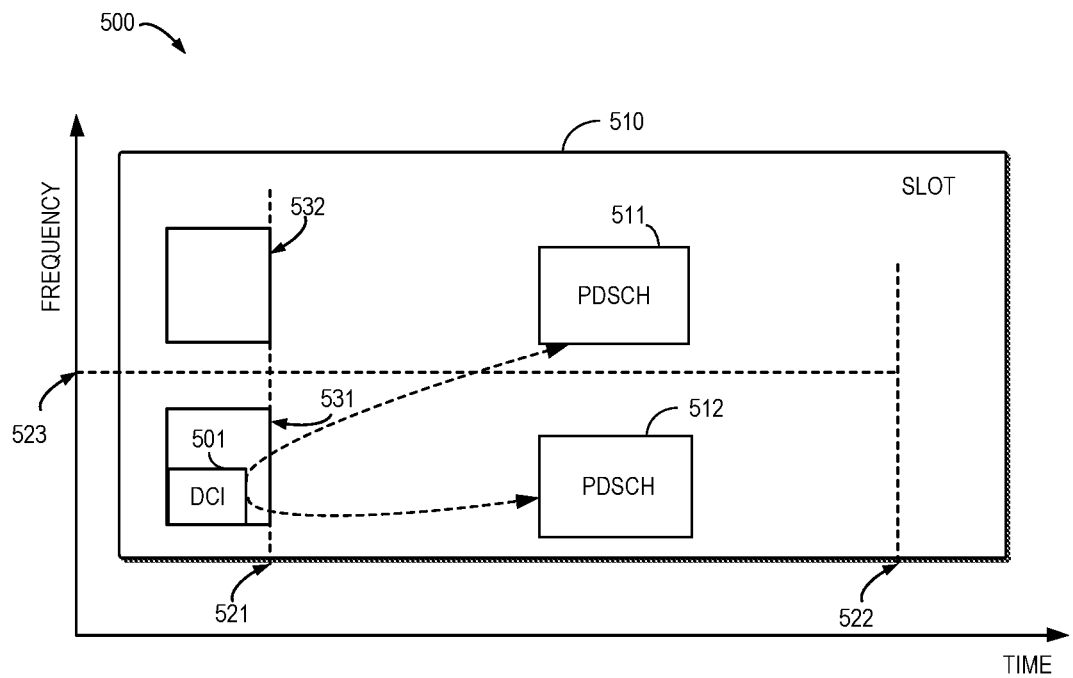
FIG. 5 shows a schematic diagram illustrating multi-PDSCH according to some embodiments of the present disclosure.

In some example embodiments, in performing the communication, a switch between the first beam and the second beam is performed based on a criterion defined in the frequency domain. Reference is now made to FIG. 5, which shows a schematic diagram 500 illustrating multi-PDSCH according to some embodiments of the present disclosure. As shown in FIG. 5, the DCI 501 may schedule a first PDSCH 511 corresponding to the first TRP 130-1 and a second PDSCH 512 corresponding to the second TRP 130-2. The time instant 521 represents an instant when the monitoring of PDCCH is ended and the time instant 522 represents an instant when the decoding of the DCI 501 is completed and/or a new beam indicated by the DCI 501 is ready for PDSCH reception.

As shown in FIG. 5, the DCI 501, the first PDSCH 511 and the second PDSCH 512 are all within the same slot 510. Since the DCI 501 has not been decoded, during the time interval between the time instants 521 and 522, the terminal device 120 may use default beams for performing communication over PDSCH. For example, the first beam may be used for resources with a frequency above the threshold frequency 523 and the second beam may be used for resource a frequency below the threshold frequency 523. As such, a switch of receiving beams occurs at the threshold frequency 523. The first beam and the second beam may be determined as described with respect to any of the above example embodiments.

The threshold frequency 523 may be considered as a FDM switching threshold for TCI. That is, a first TCI state is used above the threshold frequency 523 and a second TCI state different from the first TCI state is used below the threshold frequency 523. The FDM switching threshold may be configured by the network device 110 or may be predefined.

In some example embodiments, similar as described above with reference to FIG. 4, a URLLC CORESET may be prioritized over a non-URLLC CORESET. For example, the CORESET 531 for monitoring the DCI 501 is a URLLC CORESET and the COREST 532 is a non-URLLC CORESET. When the URLLC CORESET 531 and the non-URLLC COREST 532 overlap in time domain for DCI monitoring, and the beams associated with the two CORESETs are different, the DCI monitoring associated with the URLLC CORESET 531 may be prioritized, and the DCI monitoring associated with CORESET 531 may be ignored.

Figure 6:
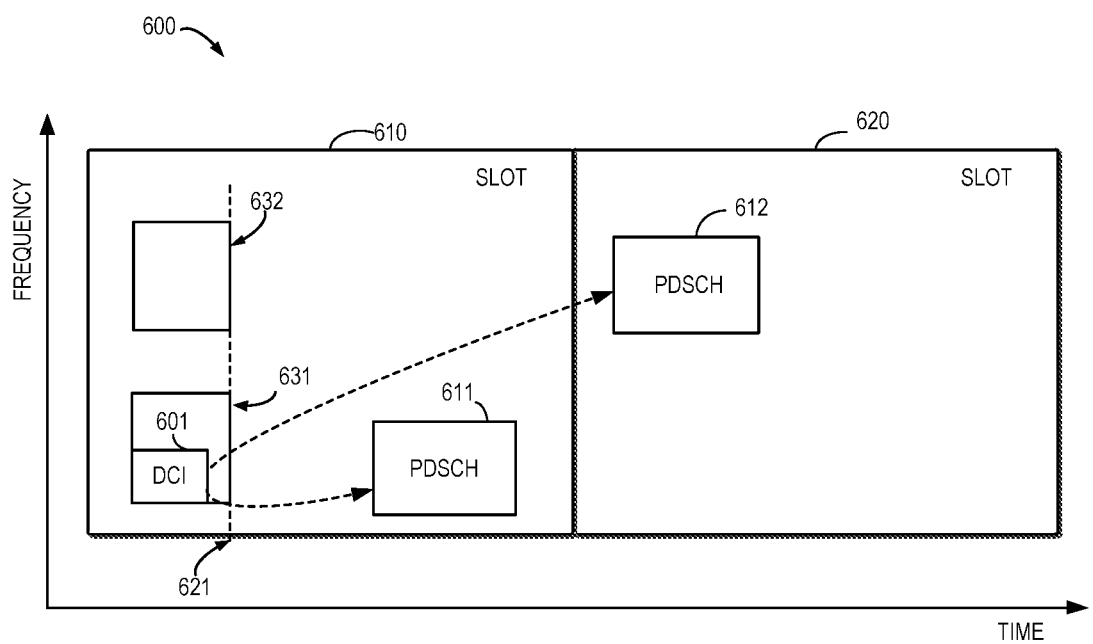
FIG. 6 shows a schematic diagram illustrating multi-PDSCH according to some embodiments of the present disclosure.

Some example embodiments where both the first and second beams are default receiving beams are described above. In some example embodiments, one of the first and second beams may be a beam as determined based on the control information, rather than a default receiving beam. Reference is now made to FIG. 6, which FIG. 6 shows a schematic diagram illustrating multi-PDSCH according to some embodiments of the present disclosure. As shown in FIG. 6, the DCI 601 may schedule a first PDSCH 611 corresponding to the first TRP 130-1 and a second PDSCH 612 corresponding to the second TRP 130-2. The time instant 621 represents an instant when the monitoring of PDCCH is ended.

As shown in FIG. 6, the DCI 601 and the first PDSCH 611 are within the same slot 610, while the second PDSCH 612 is within the slot 620 subsequent to the slot 610. In such as case, the terminal device 120 may use a first beam for performing the communication over the first PDSCH 611. The first beam may be a default beam as described with respect to any of the above example embodiments. Since the second PDSCH 612 is scheduled to be within the next slot 620, the DCI 601 may have been decoded before the reception of the second PDSCH 612. As such, the second beam may be determined based on the DCI 601 without using a default beam.

The CORESET 601 for monitoring the DCI 601 may be a URLLC CORESET. In such embodiments, a default receiving beam may be used in the same slot 610 as the URLLC CORESET with monitoring SS. A receiving beam indicated by the DCI 601 may be used in a slot after the slot 610, that is, the slot 620 in this example.

In some example embodiments, the first and second beams may be determined based on a time offset between reception of the control information and the corresponding physical shared channel. If the time offset is less than a threshold, for example, as indicated by the field "timeDurationForQCL", a default beam may be used. If the time offset is larger than the threshold, a beam as indicated by the DCI may be used.

As an example, when the field "tci-PresentInDC" is set to 'enabled' and tci-PresentInDCI is not configured in Radio Resource Control (RRC) connected mode, if the offset between the reception of the DL DCI and the corresponding first part of PDSCH is less than the threshold timeDurationForQCL, the terminal device may assume that the Demodulation Reference Signal (DM-RS) ports of the first part of PDSCH (or in other words, a first PDSCH) of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active bandwidth part (BWP) of the serving cell are monitored by the terminal device. If the offset between the reception of the DL DCI and the corresponding second part of PDSCH is larger than the threshold timeDurationForQCL, the terminal device shall use the TCI-State according to the value of the 'Transmission Configuration Indication' field in the detected PDCCH with DCI for determining the second part of PDSCH antenna port quasi co-location.

In the above, some example embodiments are described to illustrate the determination of receiving beams for PDSCH in for example multi-TRP scenarios. In this way, by using default receiving beam(s), latency due to decoding of control information can be reduced. Moreover, latency due to the switching of beams may also be reduced.

As mentioned above, in some multi-TRP communication schemes, different DCI may be used to schedule more than one PUCCH, which may correspond to different TRPs. Therefore, there is a need to address the power control mechanism between such PUCCHs.

The terminal device may determine the PUCCH transmission power $P_{PUCCH,b,f,c}$ (i,$q_u$,$q_d$,l) in PUCCH transmission occasion i based on the following equation (1):

$$P_{PUCCH,b,f,c}(i, q_u, q_d, l) =$$
$$\min \begin{Bmatrix} P_{CMAX,f,c}(i), \\ P_{0\_PUCCH,b,f,c}(q_u) + 10\log_{10}\left(2^\mu \cdot M_{RB,b,f,c}^{PUCCH}(i)\right) + PL_{b,f,c}(q_d) + \\ \Delta_{F\_PUCCH}(F) + \Delta_{TF,b,f,c}(i) + g_{b,f,c}(i,l) \end{Bmatrix} \quad (1)$$

The item $P_{O\_PUCCH,b,f,c}(q_u)$ may be composed of a component $P_{O\_NOMINAL\_PUCCH}$ and a component $P_{O\_UE\_PUCCH}$ ($q_u$). The parameter $P_{O\_NOMINAL\_PUCCH}$ which is cell specific may be referred to as $P_{0\_NOMINAL}$ and may be given in the field "in PUCCH-ConfigCommon". The parameter $P_{O\_UE\_PUCCH}$ ($q_u$) which is specific to terminal device may be referred to as $P_{0\_UE}$ and may be given in p0-Set contained in PUCCH-PowerControl. The item $PL_{b,f,c}$ ($q_d$) is a downlink pathloss estimate in dB calculated by the terminal device using RS resource index $q_d$. The RS for determining the item $PL_{b,f,c}(q_d)$ may be referred to as the pathloss RS herein for purpose of discussion.

In the multi-TRP communication schemes, the above parameters $P_{0\_NOMINAL}$, $P_{0\_UE}$, pathloss RSs and close loop index l need to be determined. The actual power for performing transmission over PUCCH corresponding to different TRPs may need to be adjusted.

Figure 7:
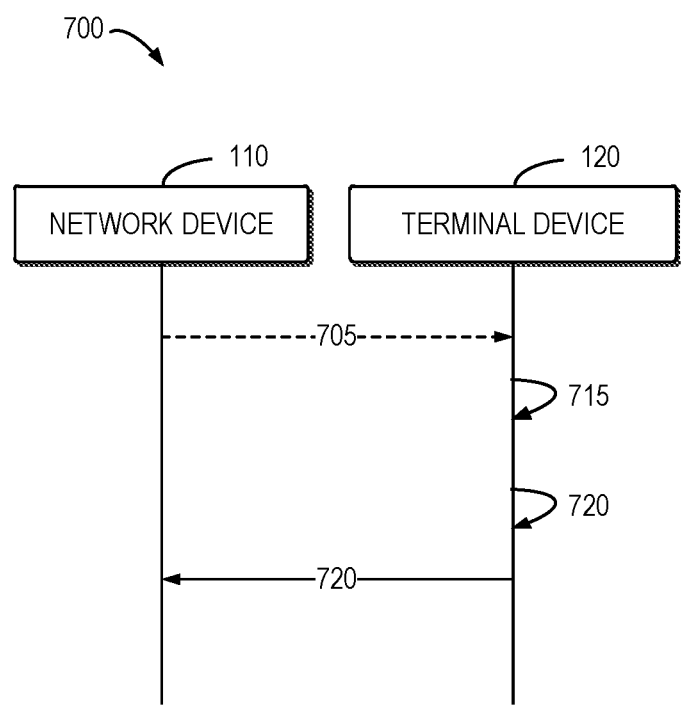
FIG. 7 is a schematic diagram illustrating an example process in accordance with some embodiments of the present disclosure.

FIG. 7 is a schematic diagram illustrating an example process 700 in accordance with some embodiments of the present disclosure. As shown in FIG. 7, the example process 700 may involve the network device 110 and the terminal device 120. It is to be understood that the process 700 may include additional acts not shown and/or may omit some acts as shown, and the scope of the present disclosure is not limited in this regard.

As shown in FIG. 7, the network device 110 may transmit 705 different control information to the terminal device 120. For example, the network device 110 may transmit different DCI corresponding to different TRPs. The different control information may schedule different uplink control channels.

Figure 8:
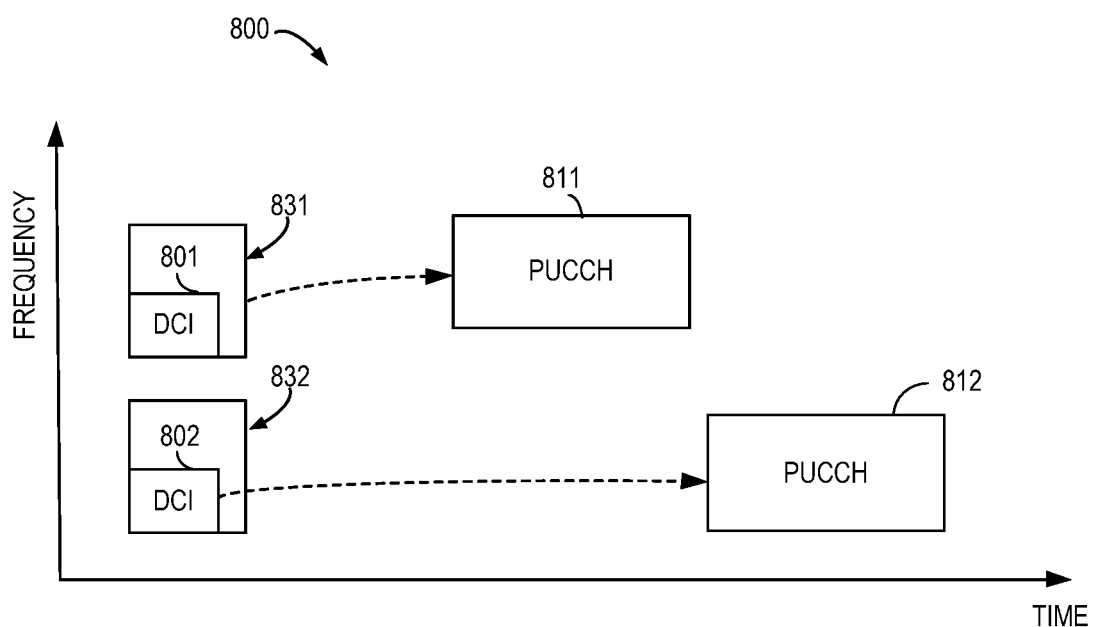
FIG. 8 shows a schematic diagram illustrating multi-PUCCH according to some embodiments of the present disclosure.

Reference is now made to FIG. 8, which shows a schematic diagram 800 illustrating multi-PUCCH according to some embodiments of the present disclosure. As shown in FIG. 8, the first DCI 801 may schedule a first PUCCH 811 and the second DCI 802 may schedule a second PUCCH 812. The first DCI 801 may correspond to the first TRP 130-1. For example, the first DCI 801 may be monitored within a first CORESET group 831, which may be configured to the first TRP 130-1. Similarly, the second DCI 802 may correspond to the second TRP 130-2. For example, the second DCI 802 may be monitored within a second CORESET group 832, which may be configured to the second TRP 130-2.

Reference is now made back to FIG. 7. The terminal device 120 determines 710 a first reference power $P1_{initial}$ for performing communication over the first uplink control channel and a second reference power $P2_{initial}$ for performing communication over a second uplink control channel. The first reference power $P1_{initial}$ and the second reference power $P2_{initial}$ may be determined based on the above equation (1). Some example embodiments are given below to describe how to determine the above parameters $P_{0\_NOMINAL}$, $P_{0\_UE}$, pathloss RSs and the close loop index I.

In some example embodiments, different TRPs or different CORESET groups may correspond to different values for the cell-specific parameter $P_{0\_NOMINAL}$. For example, the network device 110 may configure two values for the parameter $P_{0\_NOMINAL}$, with each of the two values corresponding to one TRP or one CORESET group. These two values may be included in a RRC signaling for the terminal device 120. An example information element for indicating these values may be as following:

PUCCH-ConfigCommon ::= SEQUENCE {
pucch-ResourceCommon INTEGER (0..15) OPTIONAL,
pucch-GroupHopping ENUMERATED { neither, enable, disable },
hoppingId INTEGER (0..1023) OPTIONAL,
p0-nominal_TRP1 INTEGER (–202..24) OPTIONAL,
p0-nominal_TRP2 INTEGER (–202..24) OPTIONAL,
}

It is to be understood that the above information element is given only for purpose of illustration without any limitation. The values for may be indicated to the terminal device 120 in various suitable manners.

In such example embodiments, the $P_{0\_NOMINAL}$ value for a PUCCH which is in response to DCI corresponding to a CORESET group/TRP may be associated with that CORESET group/TRP. For the example shown in FIG. 8, the $P_{0\_NOMINAL}$ value for the first PUCCH 811 may be determined based on "p0-nominal_TRP1" in the example information element, while the $P_{0\_NOMINAL}$ value for the second PUCCH 812 may be determined based on "p0-nominal_TRP2" in the example information element.

In some example embodiments, the $P_{0\_UE}$ values for different PUCCHs may be determined in a default manner, for example without a specific indication from the network device 110. The terminal device 120 may obtain a set of $P_{0\_UE}$ values which are configured by the network device 110 and select two values from the set of $P_{0\_UE}$ values to determine the reference powers $P1_{initial}$ and $P2_{initial}$. For example, the default values to be used by the terminal device 120 may be the $P_{0\_UE}$ values, such as with a p0-PUCCH-Id of 0 and 1.

As an example, if the terminal device 120 is not provided with PUCCH-SpatialRelationInfo, the terminal device 120 may obtain the first two p0-PUCCH-Value values from the P0-PUCCH with p0-PUCCH-Id equal to 0 and 1 in p0-Set. Each of the first two p0-PUCCH-Value values may correspond to the first TRP 130-1 and the second TRP 130-2, respectively.

In some example embodiments, default pathloss RSs may be used by the terminal device 120 to determine the reference powers $P1_{initial}$ and $P2_{initial}$. A first pathloss RS for the first uplink control channel may be determined based on the first control information and a second pathloss RS may be determined based on the second control information.

In some example embodiments, the terminal device 120 may determine the pathloss RSs based on a Synchronization Signal/Physical Broadcast Channel (SSB/PBCH) block and a CORESET. For example, the terminal device 120 may determine a SSB/PBCH block associated with the first control information and determine the first pathloss RS based on the SSB/PBCH block. The terminal device 120 may further select a CORESET from a set of CORESETs configured for monitoring the second control information and determine the second pathloss RS based on the selected COREST.

In other words, if the terminal device 120 is not provided with pathlossReferenceRSs or before the terminal device 120 is provided with dedicated higher layer parameters, the terminal device 120 may calculate the path loss $PL_{b,f,c}(q_d)$ for the first uplink control channel using a RS resource obtained from the SS/PBCH block that the terminal device 120 uses to obtain Master Information Block (MIB) for the first TRP. The terminal device 120 may calculate $PL_{b,f,c}(q_d)$ for the second uplink control channel using a RS resource which corresponds to the QCL RS of the CORESET with the lowest ID associated with the second TRP.

For the example shown in FIG. 8, the first pathloss RS for the first PUCCH 811 may be determined based on the SS/PBCH block that the terminal device 120 uses to obtain the MIB for the first TRP 130-1. The second pathloss RS for the second PUCCH 812 may be determined based on a CORESET (for example, with the lowest ID) in the second CORESET group 832 which corresponds to the second TRP 130-2.

In some example embodiments, the terminal device 120 may determine the pathloss RSs based on CORESETs configured for monitoring the corresponding control information. For example, the terminal device 120 may selecting a first CORESET from a first set of CORESETs configured for monitoring the first control information and determine the first pathloss RS based on the first COREST. The terminal device 120 may further select a second CORESET from a second set of CORESETs configured for monitoring the second control information and determine the second pathloss RS based on the second COREST.

In other words, if the terminal device 120 is not provided with pathlossReferenceRSs or before the terminal device 120 is provided with dedicated higher layer parameters, the terminal device 120 may calculate the path loss $PL_{b,f,c}(q_d)$ for the first uplink control channel using a RS resource which corresponds to the QCL RS of the CORESET with the lowest ID associated with the first TRP. The terminal device 120 may calculate the path loss $PL_{b,f,c}(q_d)$ for the second uplink control channel using a RS resource which corresponds to the QCL RS of the CORESET with the lowest ID associated with the second TRP.

For the example shown in FIG. 8, the first pathloss RS for the first PUCCH 811 may be determined based on the CORESET with the lowest ID in the first CORESET group 831 which corresponds to the first TRP 130-1. The second pathloss RS for the second PUCCH 812 may be determined based on the CORESET with the lowest ID in the second CORESET group 832 which corresponds to the second TRP 130-2.

In some example embodiments, the pathloss RSs may be selected from a set of RSs which are configured by the network device 110. For example, if the terminal device 120 is provided with pathlossReferenceRSs and is not provided with PUCCH-SpatialRelationInfo, the terminal device 120 may obtain two referencesignal values (for example, the first two) in PUCCH-PathlossReferenceRS from the pucch-PathlossReferenceRS-Id with index 0 and 1 in PUCCH-PathlossReferenceRS where the RS resource is either on a same serving cell or, if provided, on a serving cell indicated by a value of pathlossReferenceLinking. The obtained two referencesignal values may correspond to the first TRP and the second TRP, respectively.

In some example embodiments, one or more of the UE specific parameters $P_{0\_UE}$ values, the pathloss RSs and the close loop index (CLI) may be indicated by MAC CE from the network device 110. Table 1 shows an example structure A of MAC CE for indicating a power control parameter. In this example, the field "CLI or TRPID" may be used to indicate the close loop index l and/or the corresponding TRP.

In such a case, the UE specific parameters $P_{0\_UE}$ values and the pathloss RSs for the first and second PUCCHs may be determined as described in the above example embodiments or may be determined in other suitable manner.

TABLE 1

| Example Structure A of MAC CE | | |
|---|---|---|
| R | Serving Cell ID | BWPID |
| CLI or TRPID | PUCCH resource ID | |

Table 2 shows an example structure B of MAC CE for indicating power control parameters. In addition to the field "CLI or TRPID", the example structure B of MAC CE includes a field "P0_and_PL_RS1" and a field "P0_and_PL_RS2". The field "P0_and_PL_RS1" indicates the $P_{0\_UE}$ value and the first pathloss RS to be used for the first uplink control channel (e.g. the first PUCCH 811 shown in FIG. 8), while the field "P0_and PL_RS2" indicates the $P_{0\_UE}$ value and the second pathloss RS to be used for the second uplink control channel (e.g. the second PUCCH 812 shown in FIG. 8).

TABLE 2

| Example Structure A of MAC CE | | |
|---|---|---|
| R | Serving Cell ID | BWPID |
| CLI or TRPID | PUCCH resource ID | |
| R | P0_and_PL_RS1 | P0_and_PL_RS2 |

Table 3 shows an example structure C of MAC CE for indicating power control parameters. The example structure C of MAC CE includes a field of bitmap S7 . . . S0. The bit Si (i=0, . . . , 7) with a value of "1" activates the ith power control configuration of a $P_{0\_UE}$ value, a pathloss RS index, and/or a close loop index value (i>=0) to be used for the uplink control channel. An example power control configuration can be as follows.

```
PUCCH-PCconfiguration ::= SEQUENCE {
    pucch-PCconfiguration Id PUCCH-PCconfiguration Id,
        pucch-PathlossReferenceRS-Id PUCCH-PathlossReferenceRS-Id,
    p0-PUCCH-Id P0-PUCCH-Id,
    closedLoopIndex ENUMERATED { i0, i1 }
}
```

TABLE 3

| Example Structure C of MAC CE | | | | | | | |
|---|---|---|---|---|---|---|---|
| R | | Serving Cell ID | | | BWPID | | |
| R | | | PUCCH resource ID | | | | |
| S7 | S6 | S5 | S4 | S3 | S2 | S1 | S0 |

In such example embodiments, several advantages can be achieved. For example, the use of MAC CE can improve resource usage efficiency in UL for PUCCH. Moreover, it is not necessary to update specification about RRC and not necessary to configure spatial information.

Now reference is made back to FIG. 7. The terminal device 120 determines 715, based on the first reference power and the second reference power, a first target power for performing the communication over the first uplink control channel and a second target power for performing the communication over the second uplink control channel.

In some example embodiments, the actual power for the first PUCCH and the second PUCCH may be adjusted based on the first reference power $P1_{initial}$ and the second reference power $P2_{initial}$. The terminal device 120 performs 720 the communication over the first uplink control channel with the first target power and the communication over the second uplink control channel with the second target power.

In some example embodiments, transmissions over both the first uplink control channel and the second uplink channel may be performed with a same power. That is, the first target power and the second target power may be the same. If the first uplink control channel is prior to the second uplink control channel in time domain, the terminal device 120 may determine a time gap between an ending of the first uplink control channel and a starting of the second uplink control channel. If the time gap is below a threshold gap, the terminal device 120 may determine, based on the first reference power and the second reference power, a common target power for performing both the communication over the first uplink control channel and the communication over the second uplink control channel. For example, the maximum one or the minimum one of the first reference power and the second reference power may be used as the common power.

Figure 9:
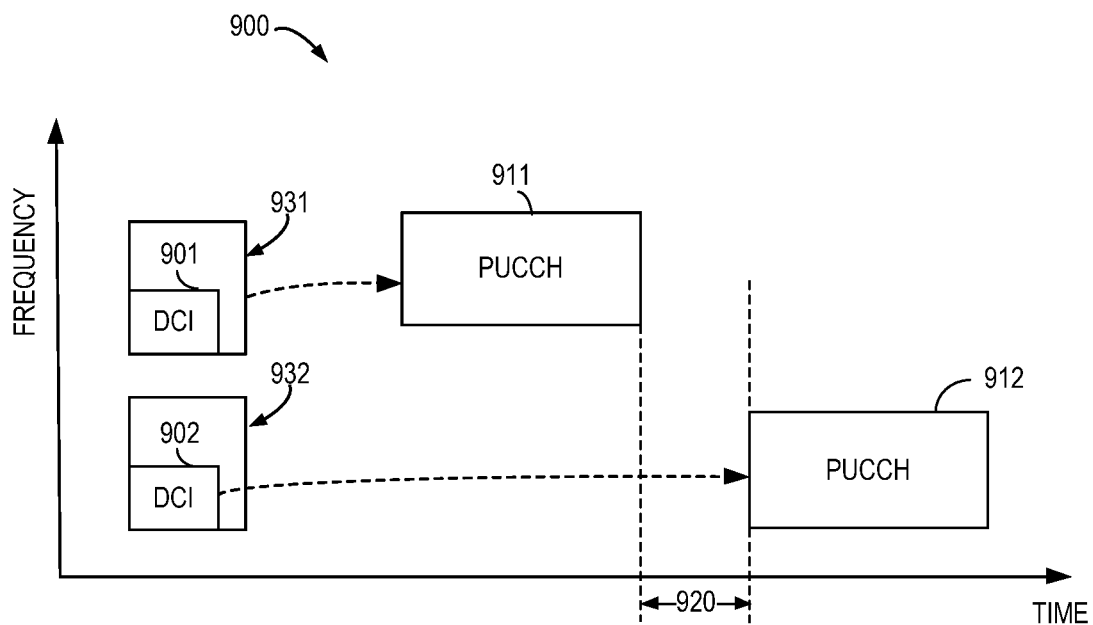
FIG. 9 shows a schematic diagram illustrating multi-PUCCH according to some embodiments of the present disclosure.

Now reference is made to FIG. 9, which shows a schematic diagram illustrating multi-PUCCH according to some embodiments of the present disclosure. As shown in FIG. 9, the first DCI 901 may schedule a first PUCCH 911 and the second DCI 902 may schedule a second PUCCH 912. The first DCI 901 may correspond to the first TRP 130-1. For example, the first DCI 901 may be monitored within a first CORESET group 931, which may be configured to the first TRP 130-1. Similarly, the second DCI 902 may correspond to the second TRP 130-2. For example, the second DCI 902 may be monitored within a second CORESET group 932, which may be configured to the second TRP 130-2.

The first reference power or the indicated power for transmission over the first PUCCH 911 may be represented as $P1_{initial}$, while the second reference power or the indicated power for transmission over the second PUCCH 912 may be represented as $P2_{initial}$. As shown in FIG. 9, the first PUCCH 911 is not overlapped with and prior to the second PUCCH 912. The terminal device 120 may determine a time gap 920 between the ending of the first PUCCH 911 and the starting of the second PUCCH 912. The terminal device 120 may determine whether the time gap 920 exceeds a threshold gap. The threshold gap may be determined based on (for example, equal to or slightly larger than) the time for the terminal device 120 to adjust transmitting power.

If the time gap 920 is less than the threshold gap, the terminal device 120 may perform the transmission over both the first PUCCH 911 and the second PUCCH 912 with a common power. The common power may be the maximum of $P1_{initial}$ and $P2_{initial}$, or the minimum of $P1_{initial}$ and $P2_{initial}$. Alternatively, the common power may be a power determined based on $P1_{initial}$ and $P2_{initial}$, for example, an average of $P1_{initial}$ and $P2_{initial}$.

If time gap 920 is equal to or larger than the threshold gap, the terminal device 120 may perform the transmission over the first PUCCH 911 with a transmitting power of $P1_{initial}$ and perform the transmission over the first PUCCH 911 with a transmitting power of $P1_{initial}$, separately. In other words, the first reference power is determined as the first target power and the second reference power is determined as the second target power.

In some example embodiments, the transmitting power may be shared between the first uplink control channel and the second uplink control channel, if the first and second uplink control channels are overlapped in time domain. The terminal device 120 may determine whether a sum of the first reference power and the second reference power exceeds a maximum power. If the sum of the first reference power and the second reference power exceeds the maximum power, the terminal device 120 may determine the first target power and the second target power such that a sum of the first target power and the second target power is below the maximum power.

Figure 10:
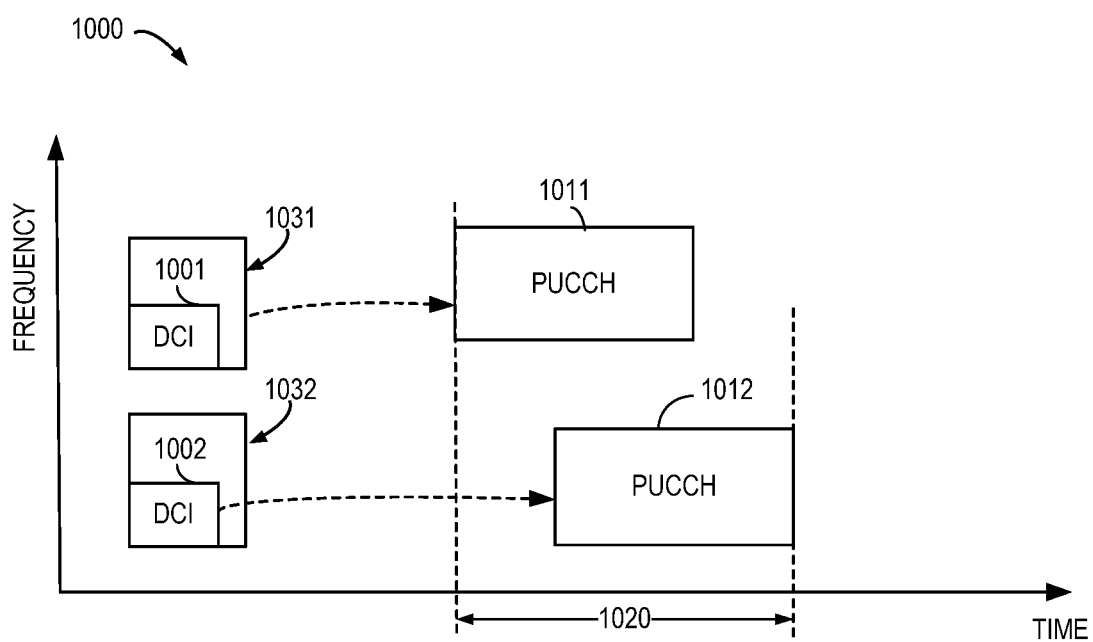
FIG. 10 shows a schematic diagram illustrating multi-PUCCH according to some embodiments of the present disclosure.

Reference is now made to FIG. 10, which shows a schematic diagram illustrating multi-PUCCH according to some embodiments of the present disclosure. As shown in FIG. 10, the first DCI 1001 may schedule a first PUCCH 1011 and the second DCI 1002 may schedule a second PUCCH 1012. The first DCI 1001 may correspond to the first TRP 130-1. For example, the first DCI 1001 may be monitored within a first CORESET group 1031, which may be configured to the first TRP 130-1. Similarly, the second DCI 1002 may correspond to the second TRP 130-2. For example, the second DCI 1002 may be monitored within a second CORESET group 1032, which may be configured to the second TRP 130-2.

The maximum power $P_{CMAX}$ may be configured for each of the first and second TRPs. For example, the first maximum power $P_{CMAX,1}$ may correspond to the first TRP 130-1 and the second maximum power $P_{CMAX,2}$ may correspond to the second TRP 130-2. For ease of discussion, the first target power for performing the transmission over the first PUCCH 1011 and the second target power for performing the transmission over the second PUCCH 1012 may be represented as P1 and P2, respectively. The total transmitting power may be shared between the first PUCCH 1011 and the second PUCCH 1012 such that the sum of the first target power P1 and the second target power P2 is no more than the sum of the first maximum power $P_{CMAX,1}$ and the second maximum power $P_{CMAX,2}$. That is, the following equation (2) will be satisfied:

$$P1+P2 \leq P_{CMAX,1}+P_{CMAX,2} \quad (2)$$

If the terminal device 120 determines that the sum of the first reference power $P1_{initial}$ and the second reference power $P2_{initial}$ exceeds the sum of the first maximum power $P_{CMAX,1}$ and the second maximum power $P_{CMAX,2}$, that is, $P1_{initial}+P2_{initial}>P_{CMAX,1}+P_{CMAX,2}$, then the terminal device 120 may adjust the actual powers for the PUCCH transmissions based on the first reference power $P1_{initial}$ and the second reference power $P2_{initial}$. The first target power P1 and the second target power P2 may be determined based on the first reference power $P1_{initial}$ and the second reference power $P2_{initial}$. For example, the ratio of P1 to P2 may be equal to the ratio of $P1_{initial}$ to $P2_{initial}$.

The time duration during which PUCCH transmission power is shared between the two PUCCHs may be determined by a union of the duration of the first PUCCH and the duration of the second PUCCH. As shown in FIG. 10, power allocation between the first PUCCH 1011 and the second PUCCH 1012 occurs during the time interval 1020.

Figure 11:
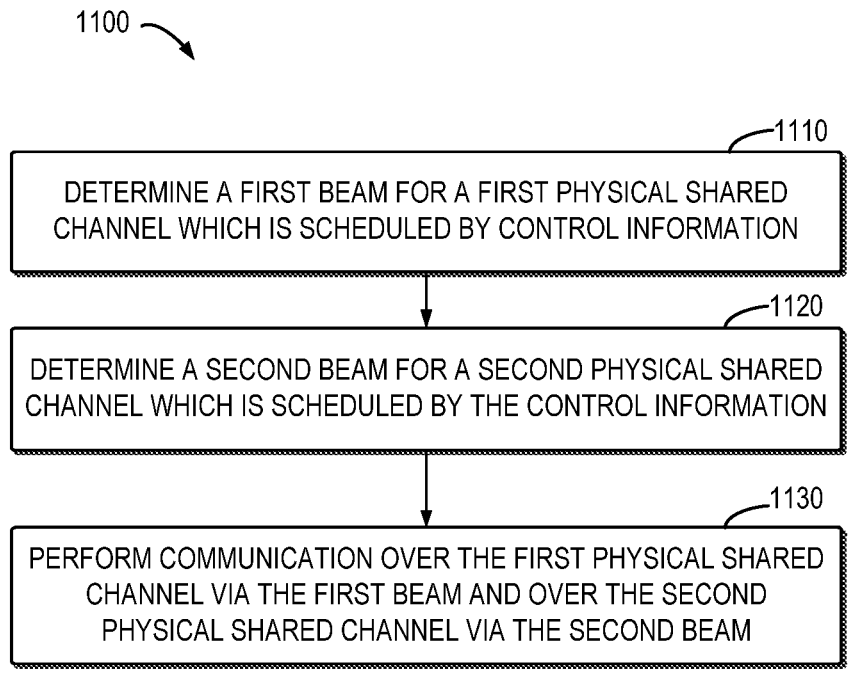
FIG. 11 illustrates an example method in accordance with some embodiments of the present disclosure.

FIG. 11 illustrates a flowchart of an example method 1100 according to some embodiments of the present disclosure. The method 1100 can be implemented at the terminal device 120 as shown in FIG. 1. It is to be understood that the method 1100 may include additional blocks not shown and/or may omit some blocks as shown, and the scope of the present disclosure is not limited in this regard. For the purpose of discussion, the method 1100 will be described from the perspective of the terminal device 120 with reference to FIG. 1.

At block 1110, the terminal device 120 determines a first beam for a first physical shared channel which is scheduled by control information. In some example embodiments, the first beam may be a default beam to be used prior to the control information being decoded and/or switching to a new beam indicated by the control information. At block 1120, the terminal device 120 determines a second beam for a second physical shared channel which is scheduled by the control information. The second beam is different from the first beam.

In some example embodiments, the terminal device 120 may select a CORESET from a set of CORESETs configured for monitoring the control information and determine a beam associated with the selected CORESET as the first beam. The terminal device 120 may further select a TCI state from a set of TCI states available for the second physical shared channel and determine a beam corresponding to the selected TCI state as the second beam.

In some example embodiments, the terminal device 120 may select a CORESET from a set of CORESETs configured for monitoring the control information and the selected CORESET may be associated with at least two beams. The terminal device 120 may further select the first beam and the second beam from the at least two beams.

In some example embodiments, the terminal device 120 may select a first TCI state from a first set of TCI states available for the first physical shared channel and determine a beam corresponding to the first TCI state as the first beam. The terminal device 120 may further select a second TCI state from a second set of TCI states available for the second physical shared channel and determine a beam corresponding to the second TCI state as the second beam.

In some example embodiments, the terminal device 120 may determine a time offset between reception of the control information and reception of the second physical shared channel. If the time offset exceeds a predetermined threshold, the terminal device 120 may determine the second beam based on the control information.

At block 1130, the terminal device 120 performs communication over the first physical shared channel via the first beam and over the second physical shared channel via the second beam.

In some example embodiments, the terminal device 120 may determine a time instant within a time interval, the control information being received during the time interval. The terminal device 120 may perform the communication over the first physical shared channel via the first beam before the time instant and perform the communication over the second physical shared channel via the second beam after the time instant.

In some example embodiments, the terminal device 120 may perform the communication over the first physical shared channel via the first beam using a first resource with a frequency above a threshold frequency. The terminal device 120 may perform the communication over the second physical shared channel via the second beam using a second resource with a frequency above the threshold frequency.

In some example embodiments, the control information is received in a first time interval. The terminal device 120 may perform the communication over the first physical shared channel via the first beam in the first time interval, and perform the communication over the second physical shared channel via the second beam in a second time interval, the second time interval being subsequent to the first time interval.

In some example embodiments, the terminal device 120 may further determine a first reference power for performing communication over a first uplink control channel and a second reference power for performing communication over a second uplink control channel, the first uplink control channel and the second uplink control channel being scheduled by different control information. The terminal device 120 may determine, based on the first reference power and the second reference power, a first target power for performing the communication over the first uplink control channel and a second target power for performing the communication over the second uplink control channel. The terminal device 120 may perform the communication over the first uplink control channel with the first target power and the communication over the second uplink control channel with the second target power.

Figure 12:
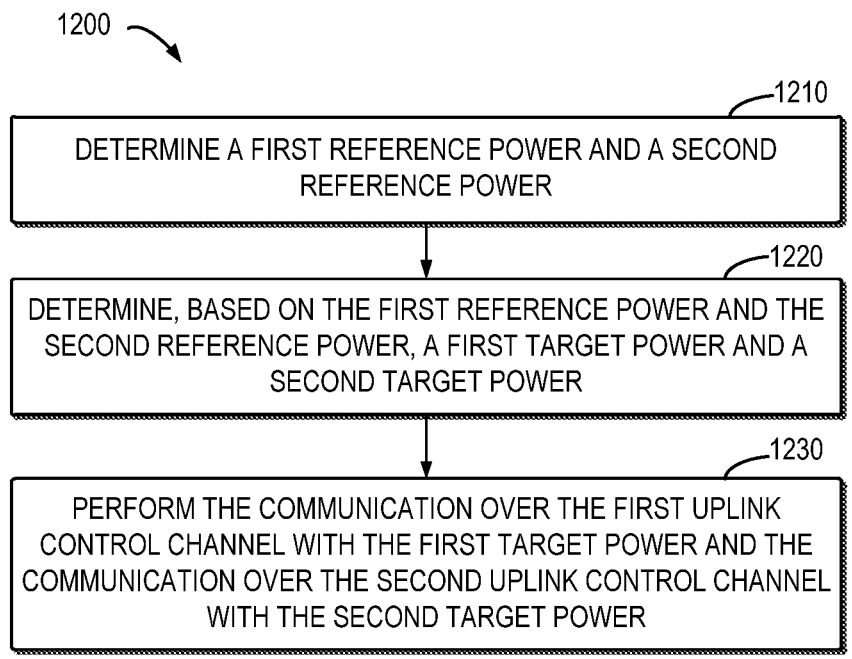
FIG. 12 illustrates an example method in accordance with some embodiments of the present disclosure.

FIG. 12 illustrates a flowchart of an example method 1200 according to some embodiments of the present disclosure. The method 1200 can be implemented at the terminal device 120 as shown in FIG. 1. It is to be understood that the method 1200 may include additional blocks not shown and/or may omit some blocks as shown, and the scope of the present disclosure is not limited in this regard. For the purpose of discussion, the method 1200 will be described from the perspective of the terminal device 120 with reference to FIG. 1.

At block 1210, the terminal device 120 determines a first reference power for performing communication over a first uplink control channel and a second reference power for performing communication over a second uplink control channel. The first uplink control channel and the second uplink control channel are scheduled by different control information.

In some example embodiments, the terminal device 120 may obtain a set of power control parameters specific to the terminal device which are configured by a network device. The terminal device 120 may select, from the set of power control parameters, two power control parameters each for determining one of the first reference power and the second reference power.

In some example embodiments, the first uplink control channel is scheduled by first control information and the second uplink control channel is scheduled by second control information. The terminal device 120 may determine, based on the first control information and the second control information, a first reference signal for determining a path loss for the first uplink control channel and a second reference signal for determining a path loss for the second uplink control channel.

In some example embodiments, the terminal device 120 may determine a SSB/PBCH block associated with the first control information and determine the first reference signal based on the SSB/PBCH block. The terminal device 120 may select a CORESET from a set of CORESETs configured for monitoring the second control information, and determine the second reference signal based on the selected COREST.

In some example embodiments, the terminal device 120 may select a first CORESET from a first set of CORESETs configured for monitoring the first control information and determine the first reference signal based on the first COREST. The terminal device 120 may select a second CORESET from a second set of CORESETs configured for monitoring the second control information, and determine the second reference signal based on the second COREST.

In some example embodiments, the terminal device 120 may receive a medium access control (MAC) control element (CE) from a network device 110, the MAC CE at least including a field indicating a power control parameter. The terminal device 120 may determine the first reference power and the second reference power based on the MAC CE.

At block 1220, the terminal device 120 determines, based on the first reference power and the second reference power, a first target power for performing the communication over the first uplink control channel and a second target power for performing the communication over the second uplink control channel.

In some example embodiments, the first uplink control channel is prior to the second uplink control channel in time domain. The terminal device 120 may determine a time gap between an ending of the first uplink control channel and a starting of the second uplink control channel. If the time gap is below a threshold gap, the terminal device 120 may determine, based on the first reference power and the second reference power, a common target power for performing both the communication over the first uplink control channel and the communication over the second uplink control channel.

Alternatively, in some example embodiments, if the time gap exceeds the threshold gap, the terminal device 120 may determine the first reference power as the first target power and the second reference power as the second target power.

In some example embodiments, the first uplink control channel is overlapped with the second uplink control channel in time domain. The terminal device 120 may determining whether a first sum of the first reference power and the second reference power exceeds a maximum power. If the first sum of the first reference power and the second reference power exceeds the maximum power, the terminal device 120 may determine the first target power and the second target power such that a second sum of the first target power and the second target power is below the maximum power.

At block 1230, the terminal device 120 performs the communication over the first uplink control channel with the first target power and the communication over the second uplink control channel with the second target power.

Figure 13:
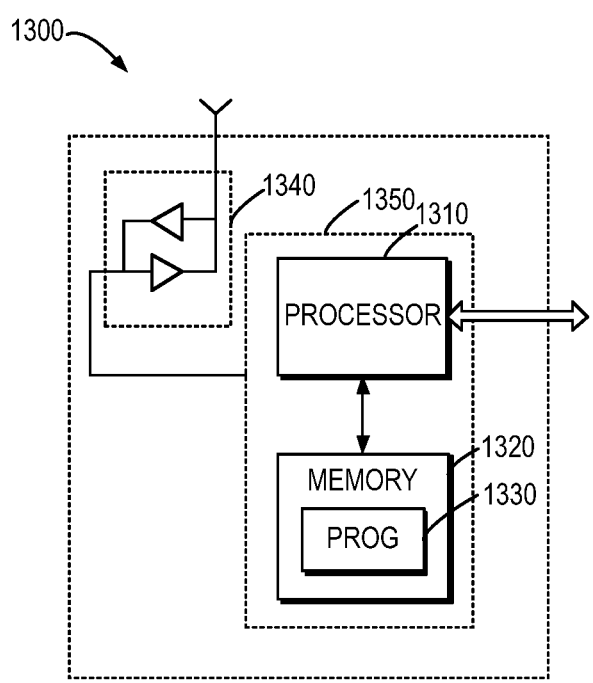
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the network device 110, the TRP 130 or the terminal device 130 as shown in FIG. 1. Accordingly, the device 1300 can be implemented at or as at least a part of the network device 110, the TRP 130 or the terminal device 130.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna to facilitate communication, though in practice an Access Node mentioned in this application may have several ones.

The communication interface may represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure, as discussed herein with reference to FIGS. 1 to 12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2, 7, 11, 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   determining a physical uplink control channel (PUCCH) transmission power in a PUCCH transmission occasion,
   wherein the determining comprising determining a downlink pathloss estimate by using a first reference signal (RS) resource index,
   wherein based on a higher layer parameter indicating at least one RS to be used for PUCCH pathloss estimation is not provided, the first RS resource index provides a RS resource configured with quasi-colocation (QCL) type D in a Transmission Configuration Indication (TCI) state of a control resource set (CORESET) with a lowest index in an active bandwidth part (BWP) of a serving cell.

2. The method of claim 1, wherein the higher layer parameter is pathlossReferenceRSs.

3. A terminal device, comprising:
   a processor configured to cause the terminal device to:
   determine a physical uplink control channel (PUCCH) transmission power in a PUCCH transmission occasion,
   wherein the terminal device is caused to determine the transmission power by determining a downlink pathloss estimate by using a first reference signal (RS) resource index,
   wherein based on a higher layer parameter indicating at least one RS to be used for PUCCH pathloss estimation is not provided, the first RS resource index provides a RS resource configured with quasi-colocation (QCL) type D in a Transmission Configuration Indication (TCI) state of a control resource set (CORESET) with a lowest index in an active bandwidth part (BWP) of a serving cell.

4. The terminal device of claim 3, wherein the higher layer parameter is pathlossReferenceRSs.

* * * * *